United States Patent
Kobori et al.

(10) Patent No.: US 8,402,941 B2
(45) Date of Patent: Mar. 26, 2013

(54) INTAKE SYSTEM FOR INTERNAL COMBUSTION ENGINE AND CONTROL METHOD OF THE SAME

(75) Inventors: Yoichi Kobori, Nagoya (JP); Masamichi Akagawa, Kariya (JP)

(73) Assignees: Toyota Jidosha Kabushiki Kaisha, Aichi-ken (JP); Denso Corporation, Aichi-Pref (JP)

( * ) Notice: Subject to any disclaimer, the term of this patent is extended or adjusted under 35 U.S.C. 154(b) by 554 days.

(21) Appl. No.: 12/526,831

(22) PCT Filed: Feb. 14, 2008

(86) PCT No.: PCT/IB2008/000641
§ 371 (c)(1), (2), (4) Date: Aug. 12, 2009

(87) PCT Pub. No.: WO2008/099282
PCT Pub. Date: Aug. 21, 2008

(65) Prior Publication Data
US 2010/0037846 A1    Feb. 18, 2010

(30) Foreign Application Priority Data
Feb. 14, 2007   (JP) .................................. 2007-033157

(51) Int. Cl.
*F02B 31/00* (2006.01)
(52) U.S. Cl. .................. 123/306; 123/337; 123/403
(58) Field of Classification Search .................. 123/306, 123/337, 403, 590
See application file for complete search history.

(56) References Cited

U.S. PATENT DOCUMENTS

| | | | | |
|---|---|---|---|---|
| 4,318,386 A | * | 3/1982 | Showalter et al. | 123/590 |
| 7,302,930 B1 | * | 12/2007 | Dudek | 123/336 |
| 7,448,357 B2 | * | 11/2008 | Dudek | 123/336 |
| 7,455,044 B2 | * | 11/2008 | Isaji et al. | 123/308 |
| 7,472,680 B2 | * | 1/2009 | Torii et al. | 123/306 |
| 2005/0155570 A1 | | 7/2005 | Confer et al. | |
| 2007/0044754 A1 | * | 3/2007 | Peffley et al. | 123/306 |
| 2007/0138693 A1 | * | 6/2007 | Torii et al. | 264/242 |
| 2010/0294228 A1 | * | 11/2010 | Kameda et al. | 123/184.56 |

FOREIGN PATENT DOCUMENTS

| | | |
|---|---|---|
| DE | 102004005480 A1 | 9/2005 |
| EP | 0221364 A2 | 5/1987 |
| EP | 1321649 A1 | 6/2003 |
| EP | 1568866 A1 | 8/2005 |
| JP | 62-24022 U | 2/1987 |
| JP | 2-7238 U | 1/1990 |
| JP | 9-203324 A | 8/1997 |
| JP | 2000-303862 A | 10/2000 |
| JP | 2002-309946 A | 10/2002 |
| JP | 2004-044459 A | 2/2004 |

\* cited by examiner

*Primary Examiner* — John Kwon
(74) *Attorney, Agent, or Firm* — Sughrue Mion, PLLC

(57) ABSTRACT

An intake system is provided with an intake flow control valve (300) provided in an intake port (50) upstream of an intake valve (70). The intake flow control valve (300) may be switched between at least a first position (300A) and a second position (300B), in accordance with the operating state of an engine, by rotating a rotary shaft (360), which is supported by a rotary shaft support part (350). In the first position, the clearance between the valve element and the inner wall of the intake port is small. In the second position, the clearance between the valve element and the inner wall of the intake port is large.

8 Claims, 3 Drawing Sheets

ENGINE IN OPERATION
(USING INTAKE FLOW CONTROL VALVE)

INTAKE SYSTEM FOR INTERNAL COMBUSTION ENGINE AND CONTROL METHOD OF THE SAME

BACKGROUND OF THE INVENTION

1. Field of the Invention

The present invention relates to an intake system for an internal combustion engine provided with an intake flow control valve in an intake port connected to a cylinder, and to a control method of the intake system. More specifically, the present invention relates to an intake system that prevents an intake flow control valve, which induces circular gas flow (vortex flow) in the cylinder according to the operating state of an internal combustion engine, from being rendered inoperable when the internal combustion engine is stopped.

2. Description of the Related Art

In order to stabilize combustion of a lean air-fuel mixture in a spark ignition internal combustion engine (hereinafter referred to as "engine"), it is important to produce gas flow such as tumble flow (vertical vortex) and swirl flow (horizontal vortex) in a cylinder, and it is necessary to enhance such gas flow across a wider operating range.

In the low-load operating range of the engine, where the throttle opening is small and the intake air amount is accordingly small, in particular, the fuel consumption and the emission tend to increase because air-fuel mixture is generally set to be slightly richer to stabilize combustion. In order to improve fuel economy and emissions, it is effective to induce circular flow of the intake air in the cylinder such as tumble flow and swirl flow to promote combustion with its strong turbulent flow.

The term "swirl flow" as used herein refers to flow of intake air circulating along the peripheral wall of the cylinder, which homogenizes intake air without producing turbulent flow, to promote combustion. Meanwhile, the term "tumble flow" as used herein refers to flow of intake air circulating along the axial direction of the cylinder, which improves combustion in the low-load operating range of the engine, because strong turbulent flow is produced as the tumble flow is deformed in the second half of the compression stroke.

In order to enhance gas flow (swirl flow and tumble flow) in the cylinder, conventional methods use an intake flow control valve to block part of the cross section of an intake port to cause intake air flowing in the intake port to flow towards one side of the intake port. In order to produce tumble flow, for example, the intake flow control valve is disposed on the lower side of the intake port to cause intake air to flow towards the upper side of the intake port, thereby enhancing tumble flow in the cylinder.

There is a clearance between the intake flow control valve and the housing that supports the intake flow control valve, and oil blown back from the combustion chamber occasionally adheres to the intake flow control valve through the clearance. A larger amount of oil adheres to the intake flow control valve when an engine key is turned off to stop the engine than during engine operation. When the engine is started, the engine speed is low and therefore the negative pressure acting on the intake flow control valve is small, which makes it difficult to blow away oil that has adhered around the intake flow control valve, resulting in a large amount oil remaining to adhere to the intake flow control valve. Oil adhering to the intake flow control valve increases the sliding resistance between the intake flow control valve and the housing, which changes the behavior of the intake flow control valve to occasionally cause a problem in the engine operation immediately after the engine is started.

When the engine is stopped for an extended period, oil adhering to the intake flow control valve may harden and cause the intake flow control valve to become stuck to the housing, thereby preventing opening and closing operation of the intake flow control valve when the engine is started.

In view of the above problem, Japanese Patent Application Publication No. 9-203324 (JP-A-9-203324) describes an intake control device for an internal combustion engine that prevents an intake flow control valve from becoming stuck by reducing the amount of oil that adheres to the intake flow control valve irrespective of the operating state of the engine. The intake control device described in JP-A-9-203324 is provided with: a throttle valve provided in an intake passage for supplying intake air to each cylinder of an internal combustion engine to adjust the amount of air supplied to each cylinder; an intake flow control valve provided in the intake passage connected to each cylinder downstream of the throttle valve to adjust the intake period of each cylinder; and a control section for determining the open period and the close period of the intake flow control valve based on the operating state of the internal combustion engine. In the intake control device, the control section closes the intake flow control valve for a certain period from a predetermined timing at which a piston of each cylinder is moving when the internal combustion engine is stopped, and then keeps the intake flow control valve half-open.

The intake control device for an internal combustion engine reduces the contact area between the intake flow control valve and a housing for supporting the intake flow control valve to a minimum by keeping the intake flow control valve half-open after closing the intake flow control valve for a certain period when the engine is stopped. It is thus possible to prevent the intake flow control valve from becoming stuck to the housing by oil that hardens when the engine is stopped.

The intake flow control valve disclosed in JP-A-9-203324 has a rotary shaft and a valve element attached to the rotary shaft. The valve element is made up of a pair of left and right disks and a valve plate integrally formed between both the disks. A shaft support part is formed to extend coaxially with the rotary shaft on the outer side of the disk in the axial direction. One end of the valve element is supported for rotation by a bearing via the shaft support part, while the other end of the valve element is coupled to a motor. An attachment part for accommodating the valve element for rotation is in a cylindrical shape, and the valve element is assembled into the attachment part from its opening end. A slight clearance is kept between the outer periphery of the disks of the valve element and the inner peripheral surface of the attachment part when the valve element is rotated. When a predetermined time elapses after engine stop, the motor is de-energized with the intake flow control valve half-open. In this state, with almost no contact area between the intake flow control valve and the valve housing, the intake flow control valve is prevented from becoming stuck to the valve housing by oil that has adhered to the intake flow control valve. That is, it is possible to blow away oil that has adhered to the intake flow control valve and prevent the intake flow control valve from becoming stuck to the valve housing by once closing the intake flow control valve at the same time as the engine key is turned off and making the intake flow control valve half-open a few seconds later.

However, because the rotary shaft of the intake flow control valve disclosed in JP-A-9-203324 extends across the diameter of the intake pipe, the valve plate produces a large fluid resistance and thus results in a large pressure loss, even when the intake flow control valve is fully open. In order to avoid such a loss, for example, the cross section of the intake pipe is formed in a shape of a quadrilateral and an arc or an elliptical arc, the side surfaces of the valve element of the intake flow control valve are formed to coincide with the side surfaces of the quadrilateral of the intake pipe, and the rotary shaft of the valve element is provided along a plane perpendicular to the side surfaces of the valve element. The rotary shaft supports the intake flow control valve only on one side (on the base of the quadrilateral) (in so-called cantilever manner) so that the valve element extends along the bottom of the intake pipe when the intake flow control valve is fully open. In JP-A-9-203324, the intake flow control valve is made half-open with almost no contact area between the intake flow control valve and the valve housing to prevent the intake flow control valve from becoming stuck to the valve housing by oil that has adhered to the intake flow control valve. Meanwhile, in the cantilever intake flow control valve, the clearance in the fully close state is set to a minimum to prevent leakage, and is therefore the same as that in the half-open state. Therefore, it is not possible to prevent the intake flow control valve from becoming stuck, due to adhesion of oil or freezing of water, even with the intake flow control valve is half-open.

SUMMARY OF THE INVENTION

The present invention provides an intake system for an internal combustion engine that is provided with an intake flow control valve that does not produce a large fluid resistance at fully-open state and that does not become inoperable due to a factor while the internal combustion engine is stopping, and provides a control method of the intake system.

A first aspect of the present invention is directed to an intake system for an internal combustion engine in which an intake port is connected to a cylinder of the internal combustion engine, and an intake valve, which opens and closes, is provided at a downstream end of the intake port. A side surface of the intake pipe connected to the intake port is at least partially substantially straight as viewed in cross section. The intake system includes: an intake flow control valve including a valve element provided upstream of the intake valve in which a side surface of the valve element confirms with the contours of the substantially straight part and a rotary shaft provided to the valve element; and rotation means for rotating the rotary shaft. The rotary shaft allows rotation of the valve element about a side surface of the intake pipe. The intake pipe is shaped such that when the valve element is in a first position, where the intake flow control valve is rotated by the rotation means until the intake pipe is closed, a clearance between the intake pipe and the valve element is smaller than the clearance when the valve element in a second position, where the intake flow control valve is rotated by the rotation means to a neutral position.

According to the first aspect, because the intake flow control valve is supported only on one side (on the bottom) in a cantilever manner, the intake flow control valve produces minimal fluid resistance when the fully open. The gap in the first state where the intake flow control valve (fully) closes the intake pipe is smaller than that in the second state where the intake flow control valve is in the neutral state. Therefore, it is possible to enhance production of vortex flow by reducing leakage of intake air flow through the gap in the first state, and to prevent the intake flow control valve from becoming stuck due to adhesion of oil or freezing of water in the second state, where the gap is larger, and the engine is stopped. As a result, the intake flow control valve does not produce a large fluid resistance when fully opened, and is not rendered inoperable (stuck) while the internal combustion engine is stopped.

In the first aspect, the cross section of the intake pipe may be fully closed in the first position, and when the valve element is in the first position, the clearance does not permit air in the intake pipe to flow past the valve element and into the cylinder.

According to the above construction, it is possible to enhance production of vortex flow by reducing leakage of intake air flow through the gap in the first position where the cross section of the intake pipe is fully closed.

In the first aspect, the neutral position is generally a position in the middle of the intake pipe, and the clearance in the second position may be sufficient to prevent the valve element from becoming stuck when the internal combustion engine is stopped.

According to the above construction, it is possible to prevent the valve element from becoming stuck to the inner wall of the intake pipe, even with adhesion of oil or freezing of water, in the second state where the gap is larger with the internal combustion engine stopped.

In the first aspect, the clearance in the second position may be greater at a position farther from the rotary shaft.

According to the above construction, because greater torque is required to rotate the rotary shaft when the valve element is stuck in a position farther from the rotary shaft, the clearance is made greater to make it more difficult to fix the valve element at a position farther from the rotary shaft. Therefore, it is possible to avoid a situation where greater torque is required to resolve fixing having once occurred. Because it is thus possible to prevent the valve element from becoming stuck at a position farther from the rotary shaft, an actuator for rotating the rotary shaft does not have to be built to demanding specifications.

A control method of an intake system according to the first aspect includes: rotating the intake flow control valve to the second position when the internal combustion engine is stopped.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
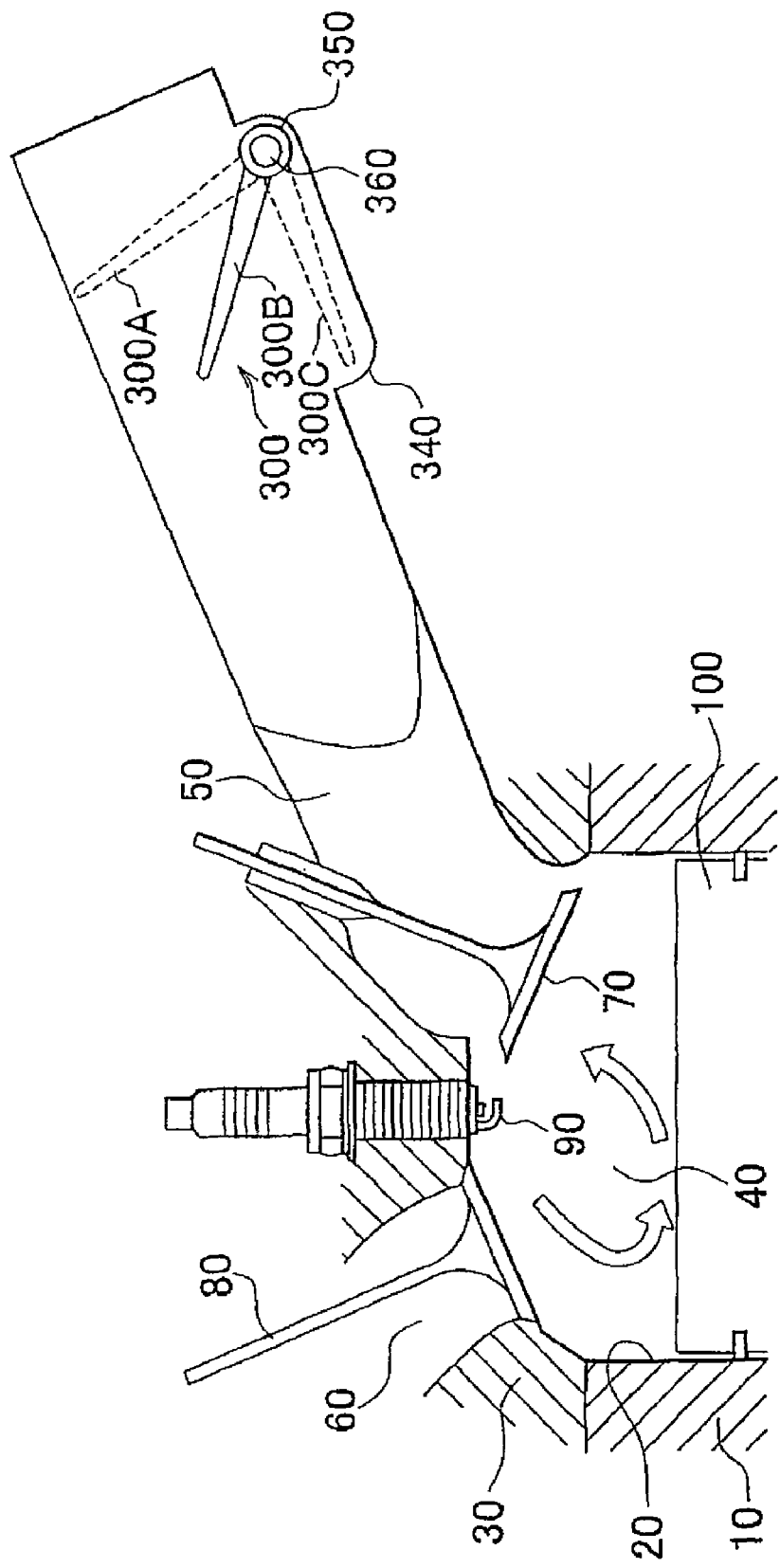
FIG. 1 is a cross sectional view showing the overall structure of an intake system in accordance with an embodiment of the present invention.

Embodiments of the present invention will be described below with reference to the drawings. In the following description, identical components are given identical reference numerals. They are also given identical names and functions. Thus, the detailed description will not be repeated for the components.

An intake system of an internal combustion engine in accordance with an embodiment will be described. The internal combustion engine described below is a spark ignition gasoline engine (hereinafter referred to as "engine"). The engine may be provided with either an injector that injects fuel into an intake port or an injector that directly injects fuel into a cylinder. Alternatively, the engine may be provided with both types of injectors.

FIG. 1 shows the overall construction of an intake system for an internal combustion engine in accordance with this embodiment applied to a spark ignition engine in which gasoline as fuel is directly injected into a cylinder. The intake system is enhances tumble flow as an example of gas flow.

As shown in FIG. 1, a cylinder 20 is formed in a cylinder block 10, and a pentroof combustion chamber 40 is formed in a cylinder head 30 covering the top of the cylinder block 10. An intake port 50 and an exhaust port 60 are formed to open in the two inclined surfaces of the combustion chamber 40. An intake valve 70 is provided to open and close the intake port 50, and an exhaust valve 80 is provided to open and close the exhaust port 60. The intake port 50 is bifurcated into two branches at its end, and a pair of intake valves 70 are provided for each cylinder to open and close the respective ends. Likewise, a pair of exhaust valves 80 are provided for each cylinder. An ignition plug 90 is disposed in the center of the combustion chamber 40, surrounded by the four valves. A piston 100 is disposed in the cylinder 20. Because the piston 100 is not an essential part of the present invention, the top surface of the piston 100 is shown as a simple flat shape. However, the top surface of the piston 100 may be formed in a shape suitable for stratified combustion or the like as appropriate.

The terms "upper" and "lower" used in regard to the intake port 50, intake flow, etc., refer to upper and lower positions with respect to the cylinder 20, and do not mean absolute upper and lower positions in space. The term "intake port" does not necessarily mean only a part inside the cylinder head 30, but may include an upstream part of the intake port may be formed as a part of a component other than the cylinder head 30, for example a part of an intake manifold (intake pipe). That is, the "intake port" may partially be composed of a component other than the cylinder head 30 such as an intake manifold.

As described above, the intake port 50 of this engine is bifurcated into two intake pipes at its end (before the combustion chamber 40). That is, the combustion chamber 40 has two intake valves 70. For example, another intake valve may be provided behind the one shown in FIG. 1. In the case where an intake flow control valve is provided in one of the intake pipes upstream of the two intake valves, fully closing the one intake pipe using the intake flow control valve and delivering air into the combustion chamber from only the other intake pipe, for example, induces vortex flow (in this case, mainly swirl flow) in the combustion chamber. Also, if an intake flow control valve is provided in at least one of the intake pipes, a vortex flow (in this case, mainly tumble flow) may be induced in the combustion chamber by controlling the opening of the intake flow control valve and delivering air into the combustion chamber from only the upper half of the one intake pipe. The present invention may be applied to engines in which vortex flow is induced in the combustion chamber by means of an intake flow control valve provided in the intake port as described above.

An intake flow control valve 300 is composed of a flat plate supported at one end. The intake flow control valve 300 is coupled to a rotary shaft 360. The rotary shaft 360 is supported by a rotary shaft support part 350 to allow rotation of the intake flow control valve 300. The rotary shaft 360 is coupled to a rotary shaft of a motor controlled by an engine electronic control unit (ECU). The intake flow control valve 300 is rotated by the motor.

An accommodation part 340 for accommodating the intake flow control valve 300 is formed on the lower side of the intake port 50.

The motor rotates forward (in the direction to rotate the intake flow control valve 300 clockwise in FIG. 1) in response to a command from the engine ECU, to rotate the intake flow control valve 300 from the position 300C, to the position 300B, and then to the position 300A where the distal end of the intake flow control valve 300 contacts the upper wall surface of the intake port 50. The rotation may be stopped by a stopper (not shown), for example. The engine ECU rotates the intake flow control valve 300 from the position 300C, to the position 300B, and then to the position 300A by outputting a rotation command signal for a predetermined period (set according to the rotation angle of the rotary shaft 360).

Also, the motor rotates backward (in the direction to rotate the intake flow control valve 300 counterclockwise in FIG. 1) in response to a command from the engine ECU, to rotate the intake flow control valve 300 from the position 300A, to the position 300B, and then to the position 300C where the intake flow control valve 300 is accommodated in the accommodation part 340. This rotation may also be stopped by a stopper (not shown), for example. The engine ECU rotates the intake flow control valve 300 from the position 300A, to the position 300B, and then to the position 300C by outputting a rotation command signal for a predetermined period (set according to the rotation angle of the rotary shaft 360).

Instead of or in addition to the stopper, a sensor may be provided to detect whether the distal end of the intake flow control valve 300 and the upper wall surface of the intake port 50 contact each other in order for the engine ECU to output a stop command to the motor. Furthermore, a sensor may be provided to detect whether the intake flow control valve 300 is accommodated in the accommodation part 340 in order for the engine ECU to output a stop command to the motor.

Figure 2:
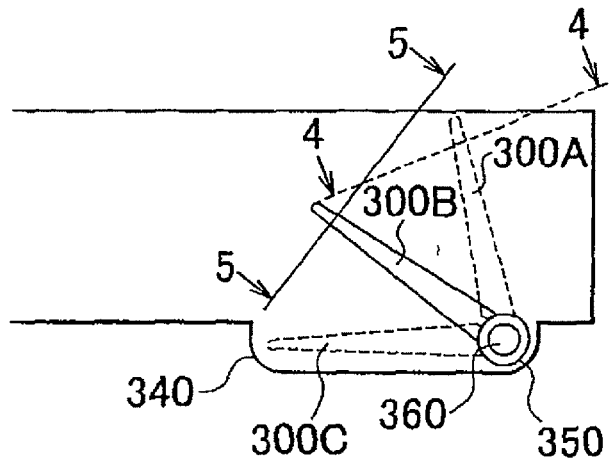
FIG. 2 is an enlarged view showing the vicinity of an intake flow control valve of FIG. 1.

FIG. 2 is an enlarged view of the vicinity of the intake flow control valve of FIG. 1. The intake flow control valve 300 is in the position 300A when it is in use with the engine in operation. In this state, it is necessary to prevent leakage of intake air flow by minimizing the clearance between the intake flow control valve 300 and the inner wall of the intake port 50. The intake flow control valve 300 is in the position 300C when it is not in use. In this state, the intake flow control valve 300 is accommodated in the accommodation part 340 to avoid producing a large fluid resistance. The intake flow control valve 300 is in the position 300B when the engine is stopped. In this state, it is necessary avoid having the intake flow control valve 300 become stuck due to adhesion of oil or freezing of water by maximizing the clearance between the intake flow control valve 300 and the inner wall of the intake port 50. Freezing of water is described in more detail. Condensation around the intake flow control valve 300 collects between the side surfaces of the intake flow control valve 300 and the inner wall of the intake port 50 when the engine is stopped, and the condensed water freezes, thereby causing the intake flow control valve 300 to become stuck. Therefore, it is easy for the intake flow control valve 300 to become stuck due to freezing of water if the clearance between the intake flow control valve 300 and the inner wall of the intake port 50 is small.

Figure 3:
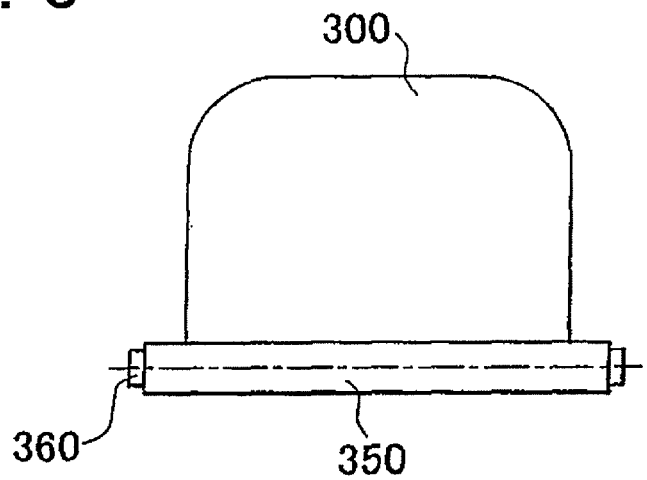
FIG. 3 shows a valve element of the intake flow control valve as viewed from the direction of intake flow.

FIG. 3 shows a valve element of the intake flow control valve 300 as viewed from the direction of intake flow (a front view of the valve element). As shown in FIG. 3, the side surfaces of the intake flow control valve 300 are perpendicular to the rotary shaft 360.

Figure 4:
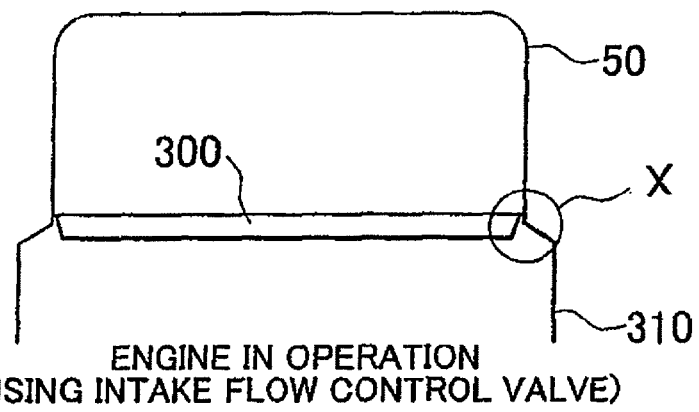
FIG. 4 is a cross sectional view taken along the line 4-4 of FIG. 2.
Figure 5:
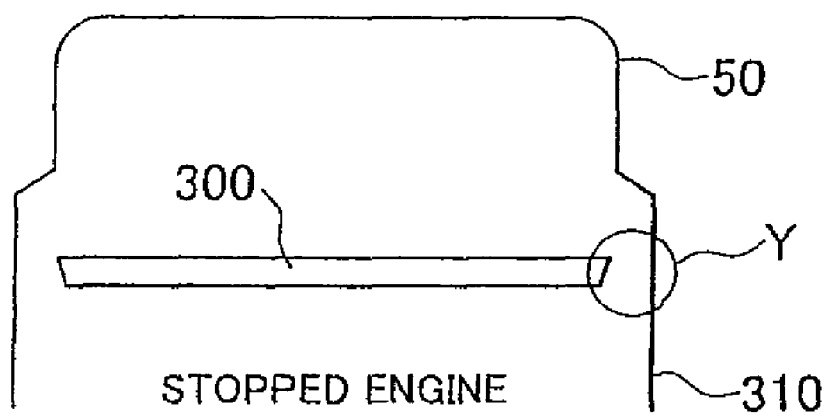
FIG. 5 is a cross sectional view taken along the line 5-5 of FIG. 2.

FIG. 4 is a cross sectional view taken along the line 4-4 of FIG. 2, showing the state where the engine is in operation, while FIG. 5 is a cross sectional view taken along the line 5-5 of FIG. 2, showing the state where the engine is not in operation.

FIG. 4 shows the state where the engine is in operation, where the intake flow control valve 300 is used in the position 300A to prevent leakage of intake air flow. At the position 300A, the inner wall of the intake port 50 is not expanded. As indicated by X in FIG. 4, the clearance between the intake flow control valve 300 and the inner wall of the intake port 50 is small. This prevents intake air flow from leaking from the side surfaces of the intake flow control valve 300 to be supplied to the engine from this intake pipe, and allows intake air flow to be supplied to the engine only through the other intake pipe (providing that two intake pipes are provided for each cylinder), in order to produce strong vortex flow in the combustion chamber 40.

Meanwhile, FIG. 5 shows the state where the engine is not in operation, where the intake flow control valve 300 is used in the position 300B. FIG. 4 and FIG. 5 illustrate a cross-sectional view of the intake port 50. A portion 310 is a lower portion of the intake port 50, and the portion 310 is wider than an upper portion of the intake port 50. At the position 300B, the inner wall of the intake port 50 is expanded as illustrated by the portion 310. As indicated by Y in FIG. 5, the clearance between the intake flow control valve 300 and the inner wall of the intake port 50 is larger than that shown in FIG. 4. This prevents the intake flow control valve 300 from being fixed while the engine stopped due to adhesion of oil or freezing of water between the intake flow control valve 300 and the inner wall of the intake port 50.

The operation of the intake system in accordance with this embodiment as described above will now be described. [When intake flow control valve is in use] Under the condition that the intake flow control valve 300 is in use with the engine in operation, the engine ECU controls the motor for rotating the rotary shaft 360 to rotate the intake flow control valve 300 to the position 300A. At this position, the inner wall of the intake port 50 is not expanded as shown in FIG. 4 and unlike that shown in FIG. 5. That is, the clearance between the intake flow control valve 300 and the inner wall of the intake port 50 is small. This prevents intake air flow from leaking from the side surfaces of the intake flow control valve 300 to be supplied to the engine from this intake pipe, allows intake air flow to be supplied to the engine only from the other intake pipe (the intake port is bifurcated into two intake pipes before the combustion chamber as described above), in order to produce strong vortex flow in the combustion chamber 40.

[When engine is stopped] Under the condition that the intake flow control valve 300 is not in use with the engine stopped, the engine ECU controls the motor for rotating the rotary shaft 360 to rotate the intake flow control valve 300 to the position 300B. At this position, the inner wall of the intake port 50 is expanded as shown in FIG. 5 (the inner diameter of the intake port 50 is expanded). That is, the clearance between the intake flow control valve 300 and the inner wall of the intake port 50 is large. This prevents the intake flow control valve 300 from becoming stuck when the engine is stopped due to adhesion of oil or freezing of water between the side surfaces of the intake flow control valve 300 and the inner wall of the intake port 50.

If the intake flow control valve 300 is fixed due to adhesion of oil or freezing of water at its distal end, in particular, the motor must produce excessive torque to free the intake flow control valve 300. Therefore, it is preferable to set a larger clearance especially at the distal end of the intake flow control valve 300.

As has been described above, according to the intake system in accordance with this embodiment, it is possible to produce strong vortex flow in the combustion chamber by preventing leakage of intake air flow when the intake flow control valve provided upstream of the intake valve to produce vortex current is fully closed. In addition, it is possible to prevent the intake flow control valve from becoming stuck by preventing adhesion of oil or freezing of water between the intake flow control valve and the inner wall of the intake port when the engine is stopped.

Modified Embodiment

Figure 6:
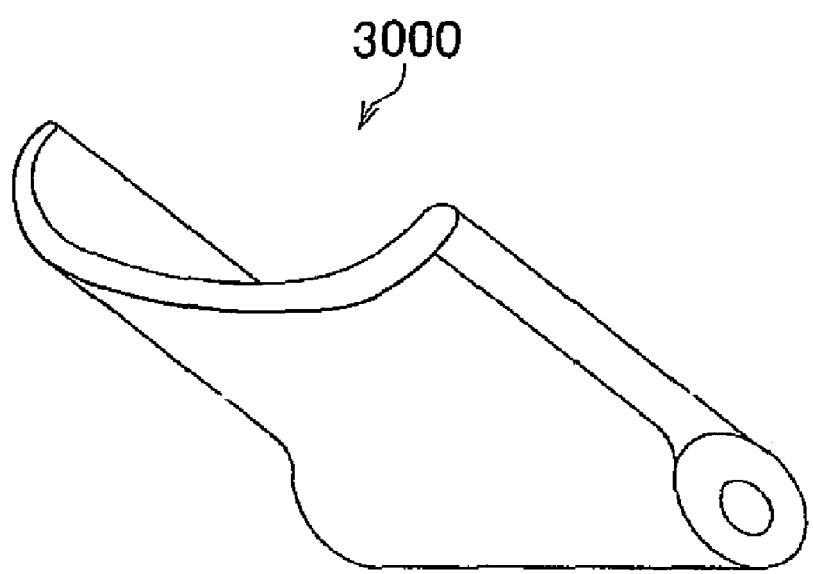
FIG. 6 is a perspective view of an intake flow control valve in accordance with a modified embodiment of the present invention.

An intake flow control valve 3000 in accordance with a modified embodiment of the present invention will now be described with reference to FIG. 6. While the intake flow control valve 300 in accordance with the embodiment described above has a valve element as a flat plate, the intake flow control valve 3000 in accordance with this modified embodiment is not completely flat but generally U-shaped as viewed in cross section. That is, the intake flow control valve 3000 has generally straight side surfaces that conform with at least a part of the contours of the side surfaces of the intake port 50 as viewed in cross section, and has a bottom surface that is perpendicular to its side surfaces.

It should be understood that the described embodiments are merely illustrative in all respects and are not to be construed as limitative. The scope of the present invention is defined not by the above description but by the appended claims, and is intended to include all equivalents covered by the claims and all modifications that fall within the scope of the claims.

The invention claimed is:
1. An intake system for an internal combustion engine, comprising:
an intake port connected to a cylinder of the internal combustion engine;
an intake valve for opening and closing the intake port provided at a downstream end of the intake port;
an intake pipe connected to the intake port, a cross-section of the intake pipe including an upper portion and a lower portion, which each of the upper portion and the lower portion have a substantially rectangular cross-section;
an intake flow control valve that includes a valve element provided upstream of the intake valve in the intake pipe and a rotary shaft that supports an end of the valve element, and that rotates the valve element about a side surface of the intake pipe that faces the end of the valve element supported by the rotary shaft; and
a rotation device that rotates the rotary shaft,
wherein the cross-section of the intake pipe is shaped such that when the valve element is in a first position, where the intake flow control valve is rotated by the rotation device until the intake pipe is closed, a clearance between a side surface of the valve element and an inner surface of the intake pipe is smaller than a clearance between the side surface of the valve element and the inner surface of the intake pipe when the valve element is in a second position, where the intake flow control valve is rotated by the rotation device to a neutral position and wherein the side surface of the valve element faces the inner surface of the intake pipe, and the side surface of the valve element is perpendicular to the rotary shaft.

2. The intake system according to claim 1, wherein the cross section of the intake pipe is fully closed in the first position, and when the valve element is in the first position, the clearance does not permit air in the intake pipe to flow past the valve element and into the cylinder.

3. The intake system according to claim 1, wherein when the valve element is in the second position, which is the neutral position, a distal end of the valve element is positioned generally in a middle of the intake pipe, between upper and lower surfaces of the intake pipe, so that the clearance between the side surface of the valve element and the inner surface of the intake pipe when the valve element is in the second position prevents the valve element from becoming stuck when the internal combustion engine is stopped.

4. The intake system according to claim 3, wherein when the valve element is in the second position, the clearance between the side surface of the valve element and the inner surface of the intake pipe is greater at a position farther from the rotary shaft than at a position closer to the rotary shaft.

5. The intake system according to claim 1, wherein when the valve element is in the first position, a distal end of the valve element contacts an inner wall surface of the intake pipe and the clearance between the intake flow control valve and the inner wall surface of the intake pipe is minimized.

6. The intake system according to claim 1, wherein when the valve element is in the first position, an inside diameter of a portion of the intake pipe at which the valve element is positioned is smaller than the diameter of the intake pipe downstream from the position of the valve element.

7. The intake system according to claim 1, wherein the intake flow control valve has a generally U-shaped cross section.

8. The intake system according to claim 1, wherein the rotational device rotates the intake flow control valve to the second position when the internal combustion engine is stopped.

* * * * *